June 10, 1969     G. PIONKE     3,448,734

TUBULAR CUTTING TOOLS

Filed May 24, 1966

Inventor
george Pionke
By
Morrison, Kennedy & Campbell
Attorneys

United States Patent Office 3,448,734
Patented June 10, 1969

3,448,734
TUBULAR CUTTING TOOLS
George Pionke, Liverpool, England, assignor to Triplex Safety Glass Company Limited, London, England, a corporation of Great Britain
Filed May 24, 1966, Ser. No. 552,586
Claims priority, application Great Britain, June 3, 1965, 23,767/65
Int. Cl. B28d 1/02, 1/24
U.S. Cl. 125—20                     1 Claim

ABSTRACT OF THE DISCLOSURE

A tubular tool for use in cutting countersunk holes in glass articles. It has a greatly prolonged useful life as compared with known tools for the same purpose. The cutting tube is solid walled with a rim constituting a continuous cutting edge; and the countersinking element of the tool is clamped onto the cutting tube for axial adjustment thereon for maintaining a predetermined distance between the grinding face of the countersinking element and the cutting edge of the cutting tube as wear takes place at that edge.

---

Figure 1:
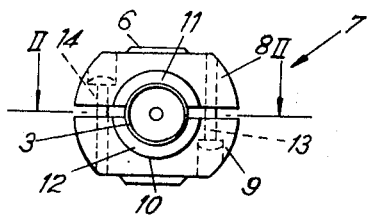

This invention relates to a tubular tool for use in cutting countersunk holes in glass articles.

An object of the present invention is to provide a tubular tool for use in cutting countersunk holes in glass articles, which tool has a greatly prolonged useful life as compared with known tools for the same purpose.

A tubular tool for use in cutting countersunk holes in glass articles, constructed in accordance with the present invention, is characterised in that the countersinking element of the tool is clamped on to the cutting tube to be axially adjustable thereon to maintain a predetermined distance between the grinding face of the countersinking element and the cutting edge of the cutting tube as wear takes place at that edge.

Whenever the cutting edge of the cutting tube has become worn down to an undesirable extent in use, the tool can be reset to restore the required predetermined distance between the cutting edge and the grinding face and the tool is ready for further use, and thus the accuracy of the tool can be maintained within required limits by periodic adjustment of the tool.

In order that the invention may be more clearly understood, the preferred embodiment thereof will now be described, by way of example, with reference to the accompanying diagrammatic drawings.

Figure 2:
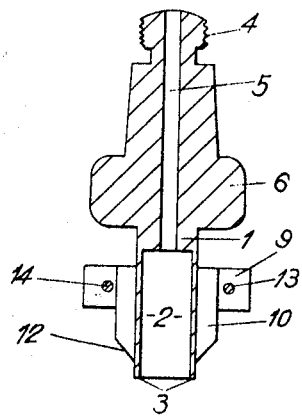
Figure 3:
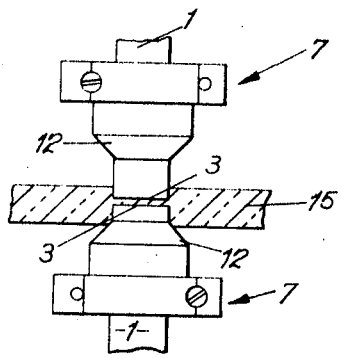

In the drawings:

FIG. 1 shows an end view of a tubular tool for cutting countersunk holes in glass articles, being the preferred embodiment of the invention, FIG. 2 shows a section taken on the line II—II of the tool shown in FIG. 1, and FIG. 3 shows a side view of two tools of the kind shown in FIGS. 1 and 2 being used in opposition to bore a hole in a sheet of glass, the glass being shown in section.

Referring to the drawings, the tubular boring tool shown in FIGS. 1 and 2 has a bronze stem 1, one end of which is formed as a cutting tube 2. The bronze of the cutting tube 2 is impregnated with diamond dust to provide a cutting edge 3 at the lower end of the cutting tube 2.

Alternatively the cutting tube 2 alone may be formed of bronze impregnated with diamond dust and this may be brazed onto the upper part of the stem 1, which upper part may be of steel.

The top end of the stem 1 is formed with a screw thread 4 which is to be screwed into a revolvable shaft of a drilling machine. Extending longitudinally of the stem 1 from the threaded end of the stem 1 to the interior of the cutting tube 2 is a bore 5 down which, when the tool is in use, a liquid such as water is passed in order to cool the cutting tool and to flush away the swarf from around the cutting edge 3 of the tool. The flow of liquid also helps to eject the plug of glass from within the cutting tube 2 when the cutting is completed.

A portion of the stem near the middle of the stem is formed as a hexagonal nut 6 to facilitate screwing the boring tool into a tapered hole in the shaft of the drilling machine.

The tool has a countersinking element consisting of a collar 7 divided in to two halves 8 and 9, and two semi-circular shells 10 and 11 fixed around the inside faces of the respective collar halves 8 and 9. These shells 10 and 11 are of bronze impregnated with diamond dust, and the lower end of each of the shells 10 and 11 is bevelled as shown at 12 in FIGS. 2 and 3 to form the grinding face of the countersinking element.

The collar 7 is clamped on to the stem 1 by two machine screws 13 and 14 in such a position that the grinding faces 12 are set back from the cutting edge 3 by whatever distance may be required for the particular work for which the tool is intended.

FIGURE 3 illustrates two cutting tools, as described with reference to FIGURES 1 and 2, being used in opposition to cut a hole in flat sheet of glass 15 shown in cross-section.

Of the two tools shown in FIGURE 3 the upper tool is set with its grinding face 12 set back from its cutting edge 3 by a distance which is greater than the thickness of the glass sheet 15. The lower tool is set with its grinding face 12 set back from its cutting edge 3 by a distance slightly less than half the thickness of the glass sheet 15.

As the tools are revolved and advanced towards each other, the cutting edges 3 of the two tools cut coaxial annular grooves in the glass and as the two cutting edges 3 approach each other in the middle of the sheet 15 the grinding face 12 of the lower tool will remove the sharp edges round the lower end of the hole being bored in the glass.

The advance of the two tools towards each other is stopped just before the cutting edges 3 would otherwise meet in the middle of the sheet 15. The lower tool is then withdrawn and the advance of the upper tool is continued to separate a cylindrical plug of glass from the sheet 15, the plug of glass being allowed to fall clear of the lower tool.

The downward advance of the upper tool is continued until its grinding face 12 has descended far enough to remove the sharp edges round the upper end of the hole.

If a deeper countersink is required, for example to receive the head of a screw or bolt which is to be passed through the hole in the sheet 15, it will be appreciated that the lower boring tool will be set up with the grinding face closer to the cutting edge than if it is required merely to smooth the edges of the hole, and the upper boring tool will be advanced further downwards to increase the depth of the upper countersink.

If two boring tools are used in a hand controlled drilling machine the directions of rotation of the upper and lower tools may be the same or may be opposite and the machine operator will stop the advance of the tools towards each other before contact is made between the cutting edges of the two tools.

If, however, the two tools are used in an automatic machine there is the possibility that if the adjustment of the machine is incorrect the cutting edges of the two tools could meet in the middle of the glass sheet 15 and they would be seriously damaged, and the heat generated could be sufficient to melt the glass. These harmful effects are avoided by causing both the upper and lower boring tools to rotate in the same direction.

When two tools are used in opposition as shown in FIGURE 3 it is advantageous for the cutting tube 2 of the upper tool to be of slightly larger diameter than the lower tube (for example 0.01″ for a 7/16″ diameter hole) so that when the upper tube is advanced right through the hole in the sheet a uniform finish is imparted to the internal surface of the hole.

After the tool has performed a number of cutting operations, the cutting edge 3 will have been worn down at a greater rate than the grinding face 12 because the cutting edge cuts into the glass during the whole cutting operation while the grinding face is only in use during the final stage of the operation. Thus, the distance of the grinding face 12 from the cutting edge 3 decreases from its original value.

When the wear on the cutting edge reaches the maximum tolerable for the work in hand, the tool can be restored to its original setting by releasing the machine screws 13 and 14, axially adjusting the countersinking element on the stem 1 until the grinding face 12 and cutting edge 3 are the required predetermined distance apart, and then tightening the machine screws 13 and 14 to clamp the countersinking element on the stem 1.

The tool is then ready for further use, and can be used until the wear again reaches the maximum tolerable value, at which time the wear can again be compensated for as described.

Although in the embodiment shown in the drawings the collar 7 is split at both sides to form two halves secured together by clamping screws 13 and 14, the collar may alternatively be split on one side only and a single threaded stud may be used to tighten the split side of the collar on to the stem 1.

Furthermore, although the boring tools described with reference to the accompanying figures, have cutting edges and grinding faces which are formed from bronze impregnated with diamond dust the cutting edge and the grinding face of the tool may alternatively be made from a hard material such as tungsten carbide.

In the preferred embodiment of the invention shown in the drawings, it is the stem 1 which is fitted into the drilling machine and the position of the collar 7 on the stem 1 is adjusted. However, it will be appreciated that the countersinking element may be of hollow, cylindrical form with the grinding face at its lower end and a threaded upper end for screwing into the shaft of the drilling machine, the lower end of the cylinder being split in the plane of the axis of the cylinder. The cutting tube may then be a tube open at both ends, which tube is inserted into the split lower end of the cylindrical countersinking element. The countersinking element is then clamped on the cutting tube around the lower end of the countersinking element, with a predetermined distance between the cutting edge of the cutting tube and the grinding face.

A cutting tool as described herein may be used for cutting countersunk holes in sheet glass articles, or in plate glass articles such as plate glass doors, to allow handles, locks or hinges to be attached to the doors.

Boring tools according to the invention may be employed advantageously in boring holes in glass sheets which are subsequently to be toughened (e.g. for car windows) because by slightly countersinking the edges of the holes, breakage of the sheets during the toughening process is minimised by the absence of sharp edges on the sheets.

It will be understood that a tubular tool for use in cutting countersunk holes in glass articles, as described herein, is considerably more economical in use than glass boring tools hitherto available, which are discarded when the wear on the cutting edge reaches the maximum tolerable value. A tool as herein described allows the countersinking element to be adjusted on the cutting tube to maintain a predetermined distance between the grinding face of the countersinking element and the cutting edge of the cutting tube as wear takes place at that edge, and the tool can then be used again. This sequence can be repeated until the limit of adjustment is reached.

Thereby a manifold increase in the useful life of the boring tool is assured, while maintaining the accuracy of the tool within predetermined limits.

I claim:
1. A tubular cutting tool for cutting holes through a sheet of glass comprising a smooth solid wall having at the operative end a rim provided with a continuous abrasive cutting edge so that as a result of driving the tool under axial pressure the ensuing rotation causes progressive advance of the cutting edge through the sheet so that at the end of the cutting operation a solid glass core is released from the sheet, a pair of complemental collar parts comprising an inner cylindrical face adapted to embrace the outer face of the tool wall and a conical abrasive grinding face to produce a countersink about the hole produced by the tool of which the leading edge of each grinding face meets the respective inner cylindrical face on the smooth wall of the tool, means for applying radial forces for clamping the complemental collar parts in predetermined axial relationship with the tool wall and thereby adjust the leading edge of the grinding face along the wall in precise relation with the cutting edge to compensate for wear at the cutting edge, so that the grinding face is in set relation with the cutting edge and evenly grinds the face of the sheet attacked by the cutting edge over a uniformly spreading annulus begun as the cutting edge approaches the end of the cutting operation until a conical countersink is formed about the hole corresponding to the form of the grinding surface.

References Cited

UNITED STATES PATENTS

| | | | |
|---|---|---|---|
| 1,111,410 | 9/1914 | Semon | 77—66 |
| 2,413,084 | 12/1946 | Sommer | 125—20 |
| 2,475,812 | 7/1949 | Alsup | 77—66 |
| 2,569,854 | 10/1951 | Hatcher | 125—20 |
| 2,686,515 | 8/1954 | Gonzalez | 125—20 |
| 2,978,846 | 4/1961 | Barron | 77—66 X |

HAROLD D. WHITEHEAD, *Primary Examiner.*